United States Patent
Tseng (10) Patent No.: US 7,969,665 B2
(45) Date of Patent: Jun. 28, 2011

(54) LENS ADJUSTING DEVICE OF PROJECTOR

(75) Inventor: Yung-Chuan Tseng, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 99 days.

(21) Appl. No.: 12/379,955

(22) Filed: Mar. 5, 2009

(65) Prior Publication Data

US 2009/0251803 A1    Oct. 8, 2009

(30) Foreign Application Priority Data

Apr. 3, 2008    (TW) .............................. 97112368 A (51) Int. Cl.
    *G02B 27/00*    (2006.01)
(52) U.S. Cl. ....................................................... 359/813
(58) Field of Classification Search .................. 359/813; 353/100; 396/73
    See application file for complete search history.

(56) References Cited

U.S. PATENT DOCUMENTS

| 6,416,184 B1 | 7/2002 | Arai et al. |
| 7,055,971 B2 | 6/2006 | Gishi |
| 7,090,360 B2 * | 8/2006 | Kuroda et al. ................ 353/119 |

* cited by examiner

*Primary Examiner* — Joseph Martinez
(74) *Attorney, Agent, or Firm* — Bacon & Thomas, PLLC (57) ABSTRACT

A lens adjusting device of a projector is provided. The lens adjusting device has a base, a frame, and at least one positioning structure. A lens is fixed on the frame. The positioning structure is utilized for movably setting the frame on the base. The positioning structure has a groove, a slider, and a positioning unit. The groove is disposed on the frame. The slider is disposed in the groove and has a guiding hole defined therein. The extending direction of the guiding hole is substantially perpendicular to the extending direction of the groove. The positioning unit is slidably disposed in the guiding hole and penetrates the guiding hole to set the frame and the slider on the base.

11 Claims, 8 Drawing Sheets

LENS ADJUSTING DEVICE OF PROJECTOR

BACKGROUND OF THE INVENTION (1) Field of the Invention

The invention relates to a lens adjusting device, and more particularly relates to a lens adjusting device of a projector.

(2) Description of the Prior Art

Figure 1:
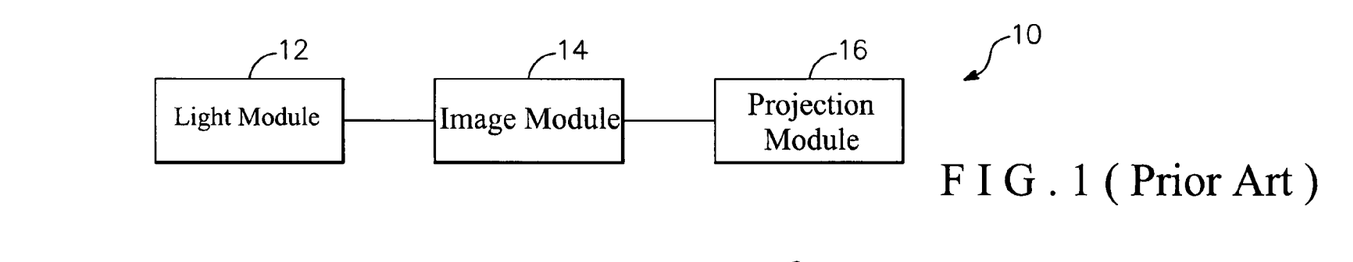
FIG. 1 is a block diagram of a conventional projector.

FIG. 1 is a block diagram of a conventional projector 10. As it shows, the projector 10 has a light module 12, an image module 14, and a projection module 16. The image module 14 is utilized to transfer inputted image signals into image beams. The image beams are then projected to the screen through the lens of the projection module 16.

Figure 2:
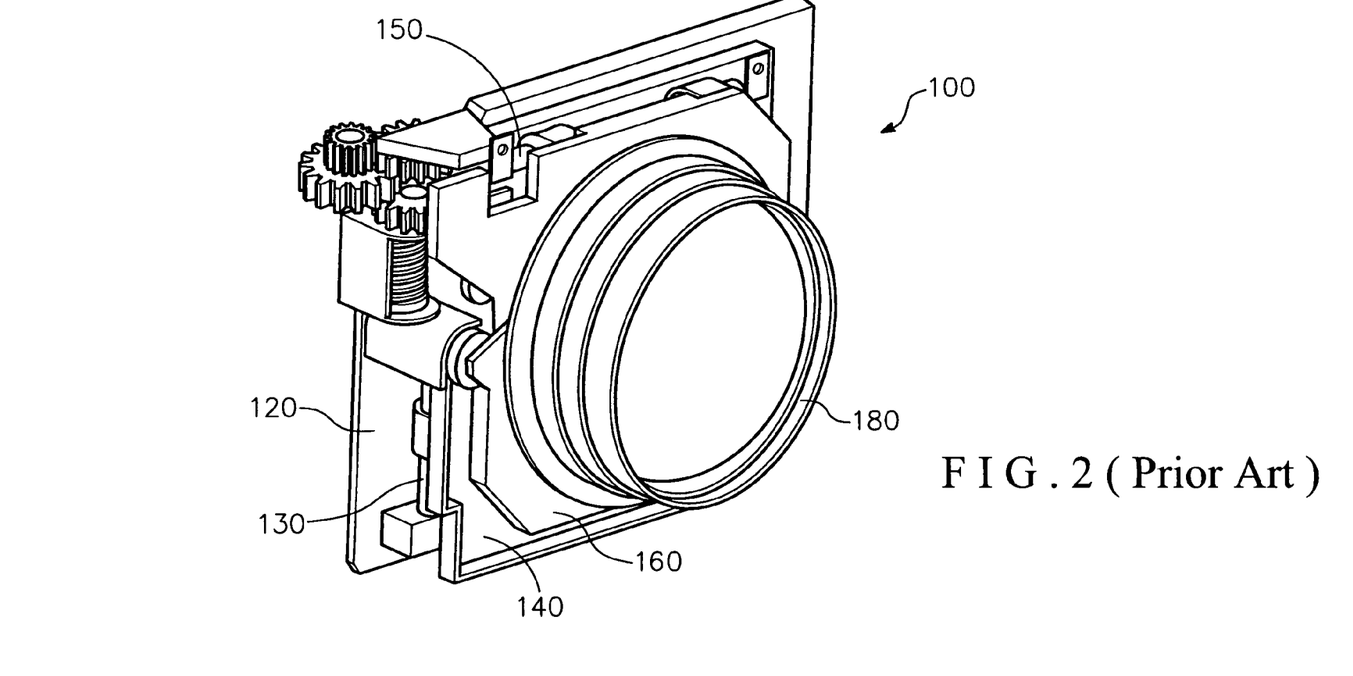
FIG. 2 is a schematic view of the lens adjusting device of a conventional projector.

The location of the lens must be adjustable for adjusting the image on the screen. FIG. 2 is a schematic view of a lens adjusting device 100 of a conventional projector. As it shows, the lens adjusting device 100 has a base 120, a vertical adjusting frame 140, and a horizontal adjusting frame 160. The left and right sides of the base 120 have two guiding bars 130 assembled thereon. The vertical adjusting frame 140 is disposed on the two guiding bars 130. The up and down sides of the vertical adjusting frame 140 have two guiding bars 150 assembled thereon. The horizontal adjusting frame 160 is disposed on the two guiding bars 150. The lens 180 is assembled on the horizontal adjusting frame 160. The vertical adjusting frame 160 of the lens adjusting device 100 may be utilized as a vertical movable platform and the horizontal adjusting frame 140 as a horizontal movable platform to adjust to location of the lens.

It is noted that the lens adjusting device 100 needs two separate frames 140,160 and four guiding bars 130, 150 to adjust the lens. The whole structure is rather complicated. Excessive components raise not only the cost but also the weight. In addition, the excessive components also need a large room to hold this lens adjusting device 100.

SUMMARY OF THE INVENTION

The invention is to simplify the structure of the lens adjusting device by reduce the number of frames and keep lens adjusting function at the same time.

According to an embodiment of the present invention, a lens adjusting device is provided. The lens adjusting devices includes a base, a frame, a lens, and at least one positioning structure. The lens is fixed on the frame. The positioning structure is utilized for movably setting the frame on the base. The positioning structure has a groove, a slider, and a positioning unit. The groove is disposed on the frame. The slider is disposed in the groove and has a guiding hole defined therein. The extending direction of the guiding hole is substantially perpendicular to the extending direction of the groove. The positioning unit is slidably disposed in the guiding hole and penetrates the guiding hole to set the frame and the slider on the base.

In contrast with the lens adjusting device shown in FIG. 2 which needs two separated frames and four guiding bars for achieving the object of lens adjustment, the lens adjusting device provided in the embodiment of the invention saves a frame and replaces the guiding bars with smaller and simpler positioning structure. Thus, the lens adjusting device according to the embodiment of the invention is helpful for reducing cost and fulfills the demand of slim projectors.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will now be specified with reference to its embodiment illustrated in the drawings, in which.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
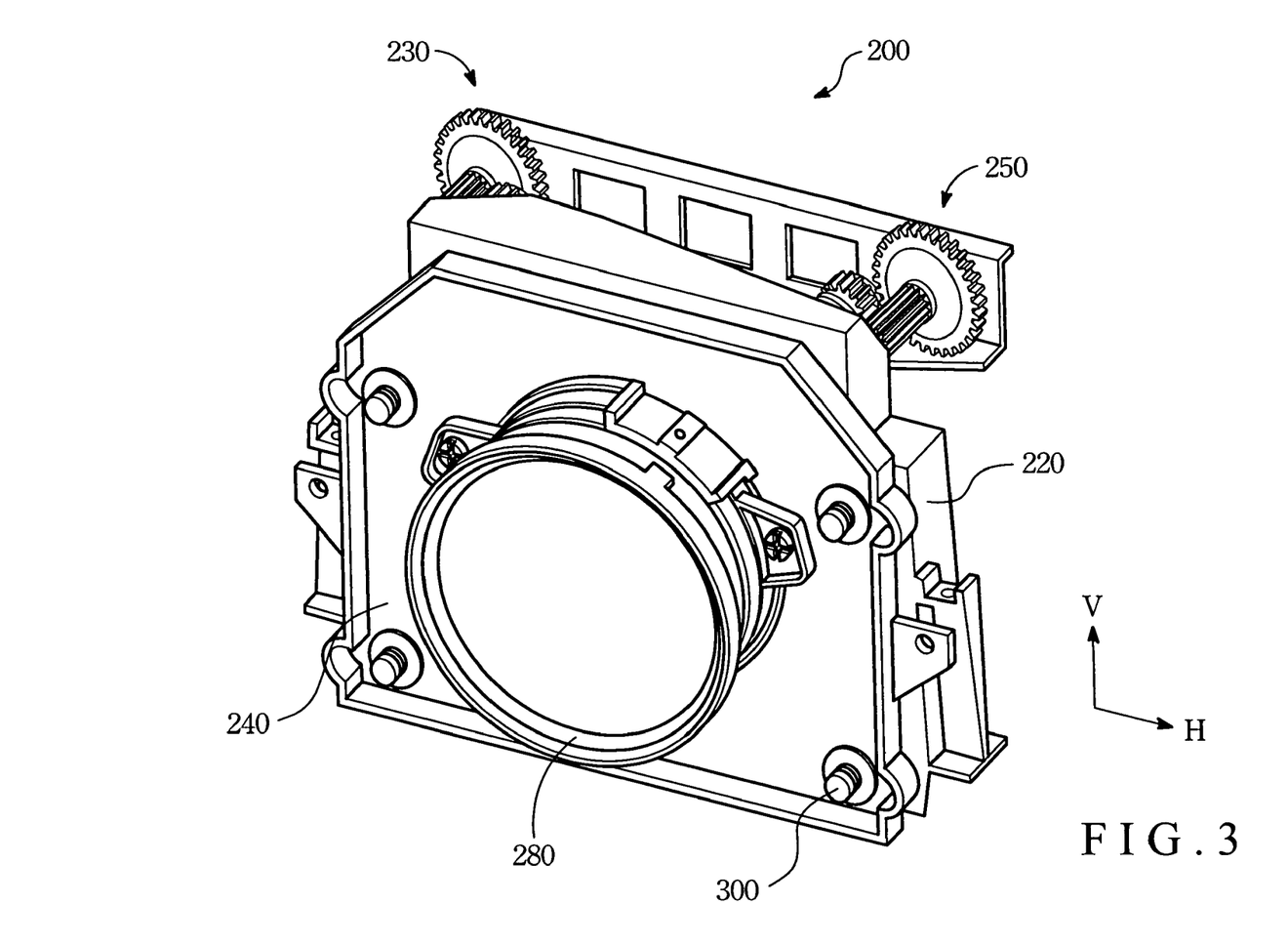
FIG. 3 is a schematic view of an embodiment of the lens adjusting device according to the invention.

FIG. 3 is a schematic view of an embodiment of the lens adjusting device 200 according to the invention. As it shows, the lens adjusting device 200 has a base 220, a frame 240, and at least one positioning structure 300. For stably supporting the lens, the number of the positioning structure 300 may be three or more. In FIG. 3, four positioning structures 300 are used in the embodiment as an example. A lens 280 is fixed on the frame 240. The positioning structures 300 are utilized for movably setting the frame 240 on the base 220. These positioning structures 300 are distributed around the lens 280 symmetrically.

Figure 4A:
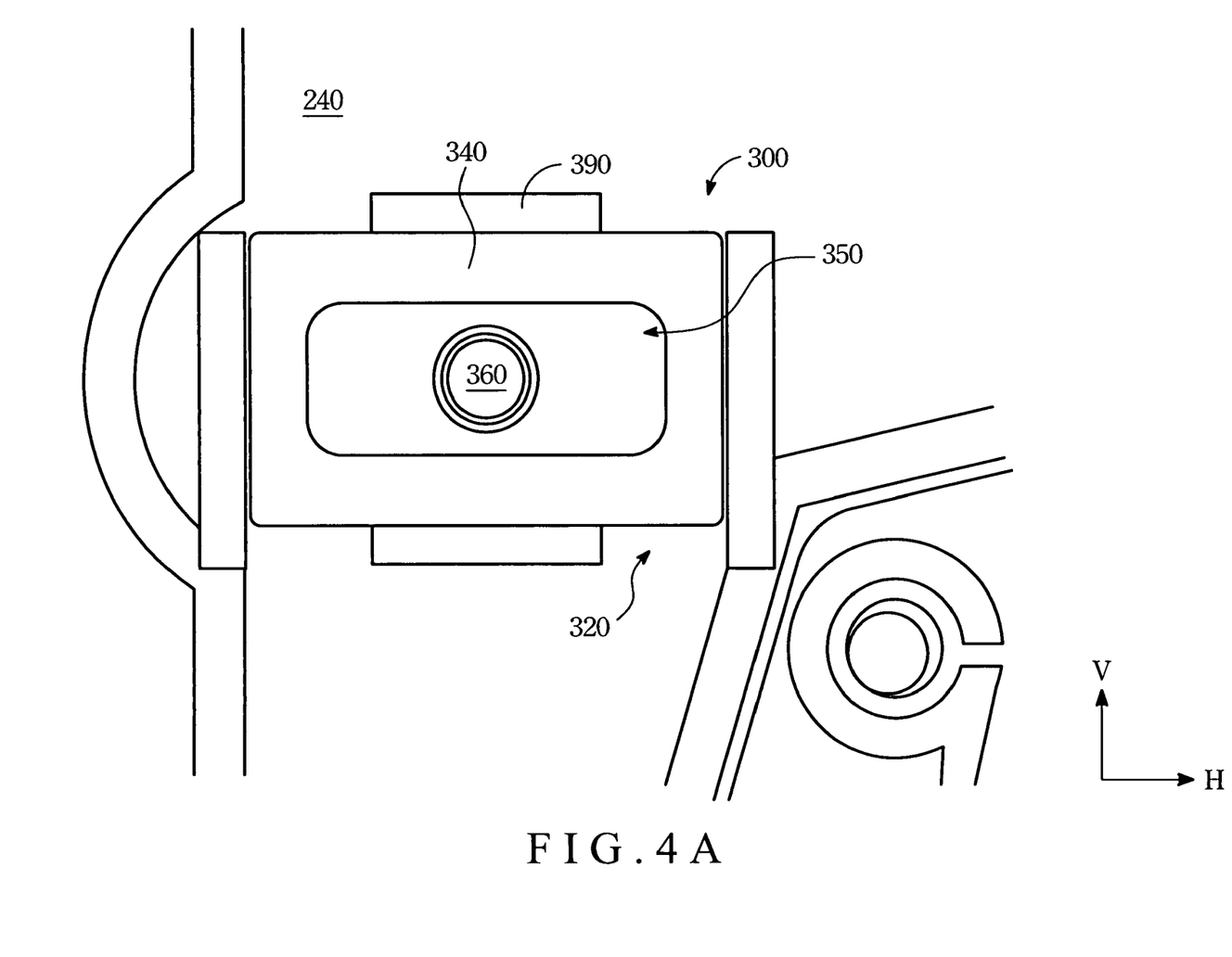
FIG. 4A is a schematic view of an embodiment of the positioning structure in FIG. 3.

For a better understanding, referring to FIG. 4A, the base 220 is removed to show the positioning structure 300 on the back of the frame 240. As it shows, the positioning structure 300 has a groove 320, a slider 340, and a positioning unit 360. The groove 320 is disposed on the frame 240. The slider 340 is disposed in the groove 320 and glides along the groove 320. For an embodiment, the groove 320 is disposed on a surface of the frame 240 facing the base 220, and the surface is also the back surface of the frame 240. Moreover, the groove 320 is rectangular in shape with an opening facing the base 220. The slider 340 restricted by the groove 320 may only move linearly along the groove 320.

The slider 340 has a guiding hole 350 defined therein. The extending direction of the guiding hole 350 is substantially perpendicular to the extending direction of the groove 320. The positioning unit 360 penetrates the guiding hole 350 and is slidably disposed in the guiding hole 350. In this embodiment, the extending direction of the groove 320 is parallel to the vertical direction V, and the extending direction of the guiding hole 350 is parallel to the horizontal direction H. However, the embodiment of the invention is not so limited. The extending directions of the groove 320 and the guiding hole 350 may be parallel to the horizontal direction H and the vertical direction V respectively, or show an angle of inclination.

Figure 4B:
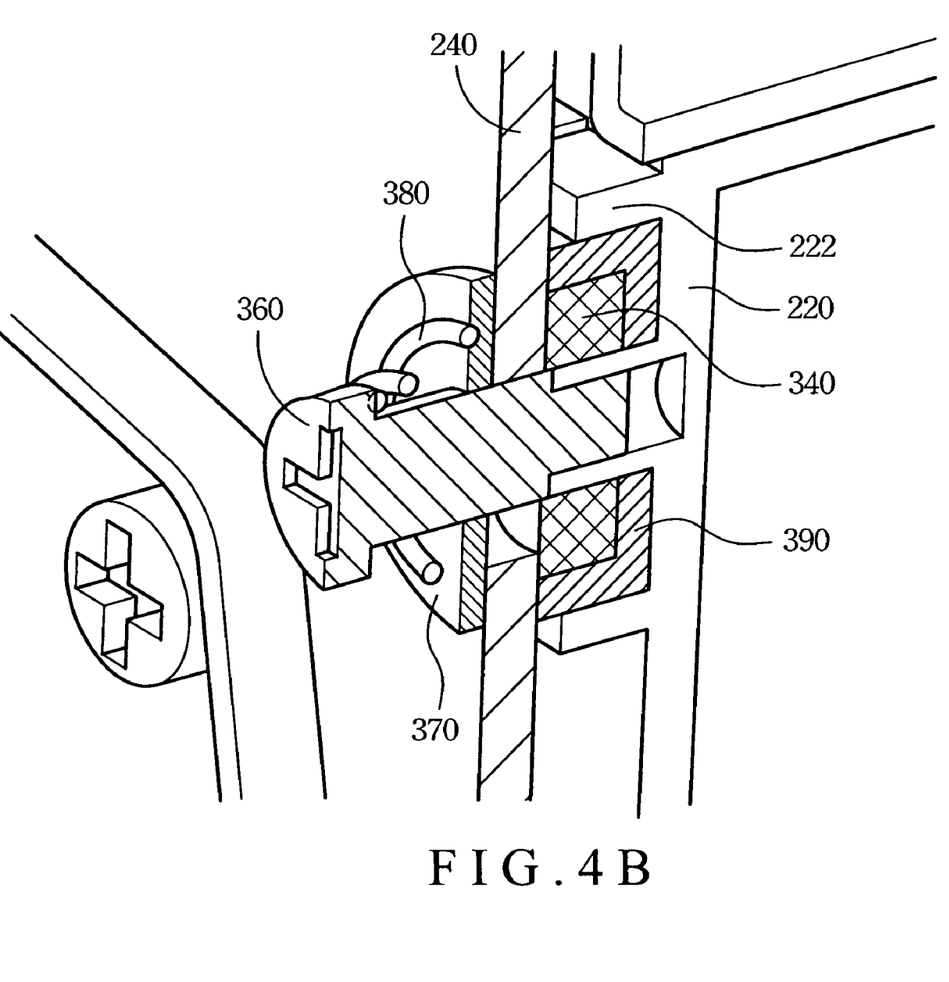
FIG. 4B is a cross-section view of the positioning structure in FIG. 3 along the vertical direction V.
Figure 4C:
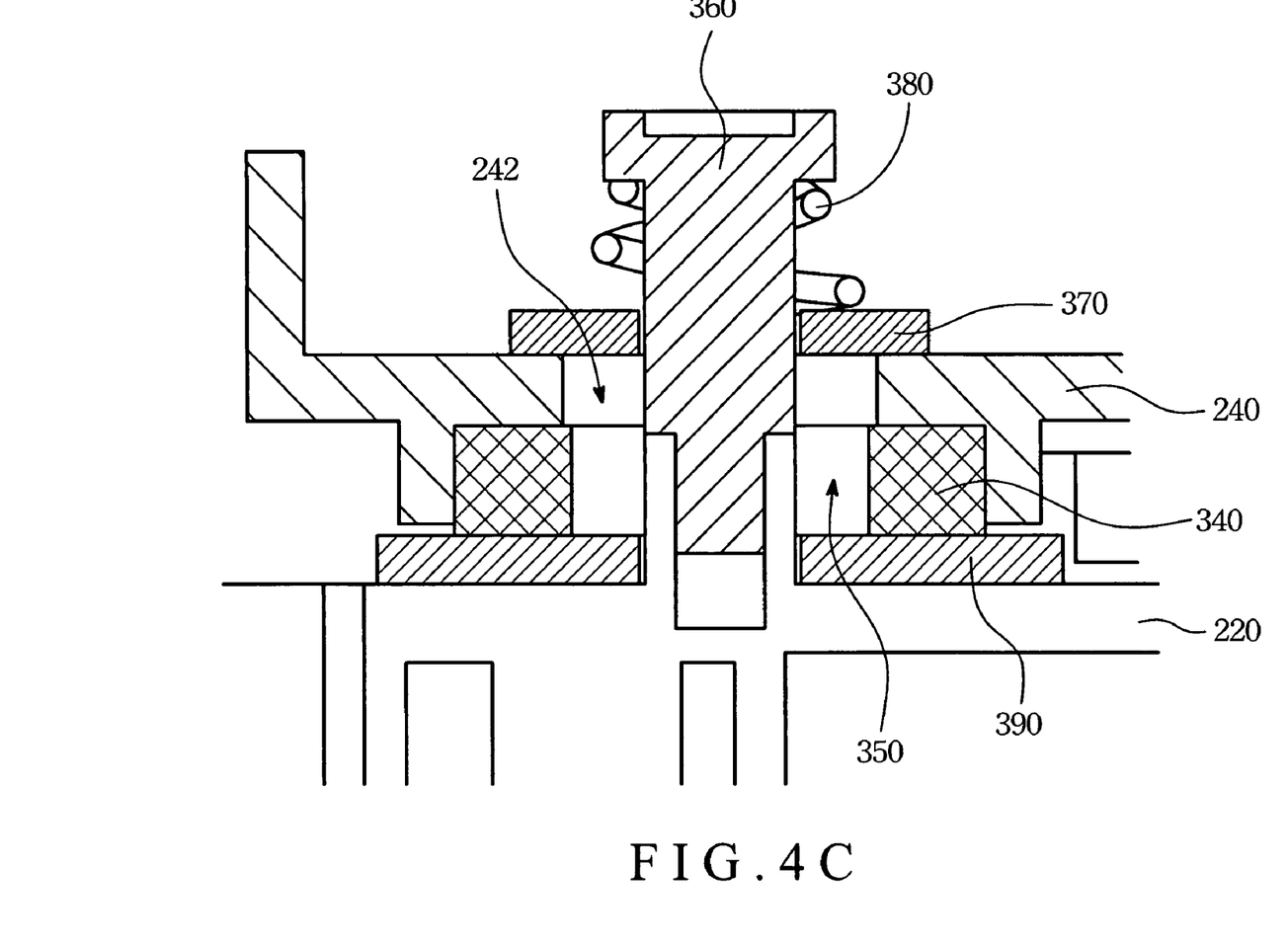
FIG. 4C is a cross-section view of the positioning structure in FIG. 3 along the horizontal direction H.

FIGS. 4B and 4C are cross-section views of the positioning structure 300 of FIG. 3 along the vertical direction V and the horizontal direction H, respectively. As shown in FIG. 4B, in order to ensure the accuracy of the adjustment of the lens, two baffle structures 222 are fabricated on the surface of the base 220 facing the frame 240 and corresponding to the opposite sides of the slider 340 respectively. The extending directions of the two baffle structures 222 are substantially perpendicular to the extending direction of the groove 320 and slidably contact the opposite sides of the slider 340 respectively. Therefore, unnecessary shaking between the slider 340 and the base 220 to affect the accuracy of the positional adjustment of the lens is avoided.

Furthermore, as shown in FIGS. 4A and 4C, the profile of the guiding hole 350 is rectangular in shape. The top and bottom sides of the guiding hole 350 have holes respectively for allowing the positioning unit 360 to penetrate the slider 340 through the guiding hole 350. In addition, the frame 240 has a through hole 242 corresponding to the positioning unit 360. Hence, the positioning unit 360 may penetrate the slider 340 and the frame 240 to set the frame 240 on the base 220. For an embodiment, the positioning unit 360 may be a screw.

To avoid the shaking of the frame 240, the positioning unit 360 has to exert enough pressure to set the frame 240. However, in another aspect, to ensure that the frame 240 and the slider 340 is able to glide with respect to the base 220, the positioning unit 360 may reserve proper flexibility instead of completely locking the frame 240 to the base 220. Thus, as shown in FIGS. 4B and 4C, the positioning structure 300 in this embodiment has a washer 370 and an elastic unit 380. The washer 370 is disposed on the through hole 242 of the frame 240 and covers the through hole 242. The elastic unit 380 is disposed on the washer 370. Meanwhile, the size of the opening of the washer 370 is smaller than the size of the through hole 242. The positioning unit 360 (the screw as shown) presses the frame 240 and the slider 340 on the base 220 through the elastic unit 380 and the washer 370. Moreover, to reduce the friction between the frame 240 and the base 220 as well as the slider 340 in the horizontal direction (the extending direction of the guiding hole 350), for an embodiment, a spacer 390 may be disposed between the slider 340 and the base 220 as well as between the slider 340 and the baffle structure 222, so as to prevent the slider 340 from contacting the base 220 directly.

The embodiment of the invention adopts the positioning structure 300 to movably disposed the frame 240 on the base 220. Because the positioning unit 360 penetrates the through hole 242 to set on the base 220, the movable range of the frame 240 with respect to the base 220 is restricted by the size of the through hole 242. Based on this, as shown in FIGS. 4B and 4C, the size of the through hole 242 is larger than the cross-section size of the end of the positioning unit 360 penetrating the through hole 242.

However, the positioning unit 360 in the through hole 242 is able to exert pressure on the frame 240 to dispose the frame 240 on the base 220. For an embodiment, the positioning unit 360 is able to support at least the weight of the frame 240 and the lens 280. Thus, to make sure that the positioning unit 360, whose the cross-section size of the end is smaller than the through hole 242, may exert pressure on the frame 240, as shown in FIGS. 4B and 4C, the cross-section size of the washer 370 is larger than the size of the through hole 242. Meanwhile, no matter where the frame 240 moves, the washer 370 is capable of maintaining the position above the through hole 242 to make the positioning unit 360 exert pressure on the frame 240 through the washer 370.

Figure 5A:
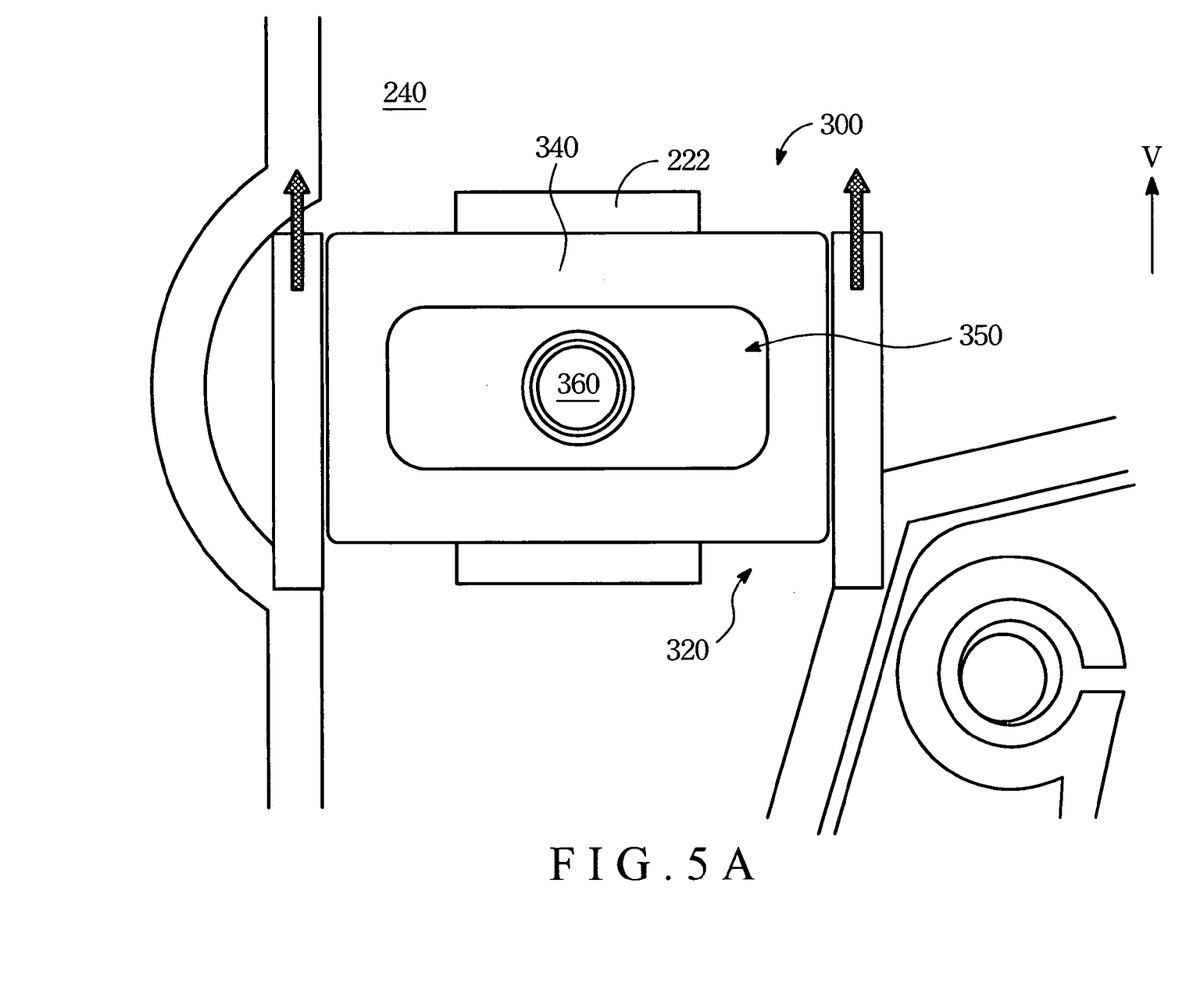
FIGS. 5A and 5B are schematic views showing the lens adjusting device in FIG. 3 adjusting the position of the lens along the vertical direction V and the horizontal direction H.
Figure 5B:
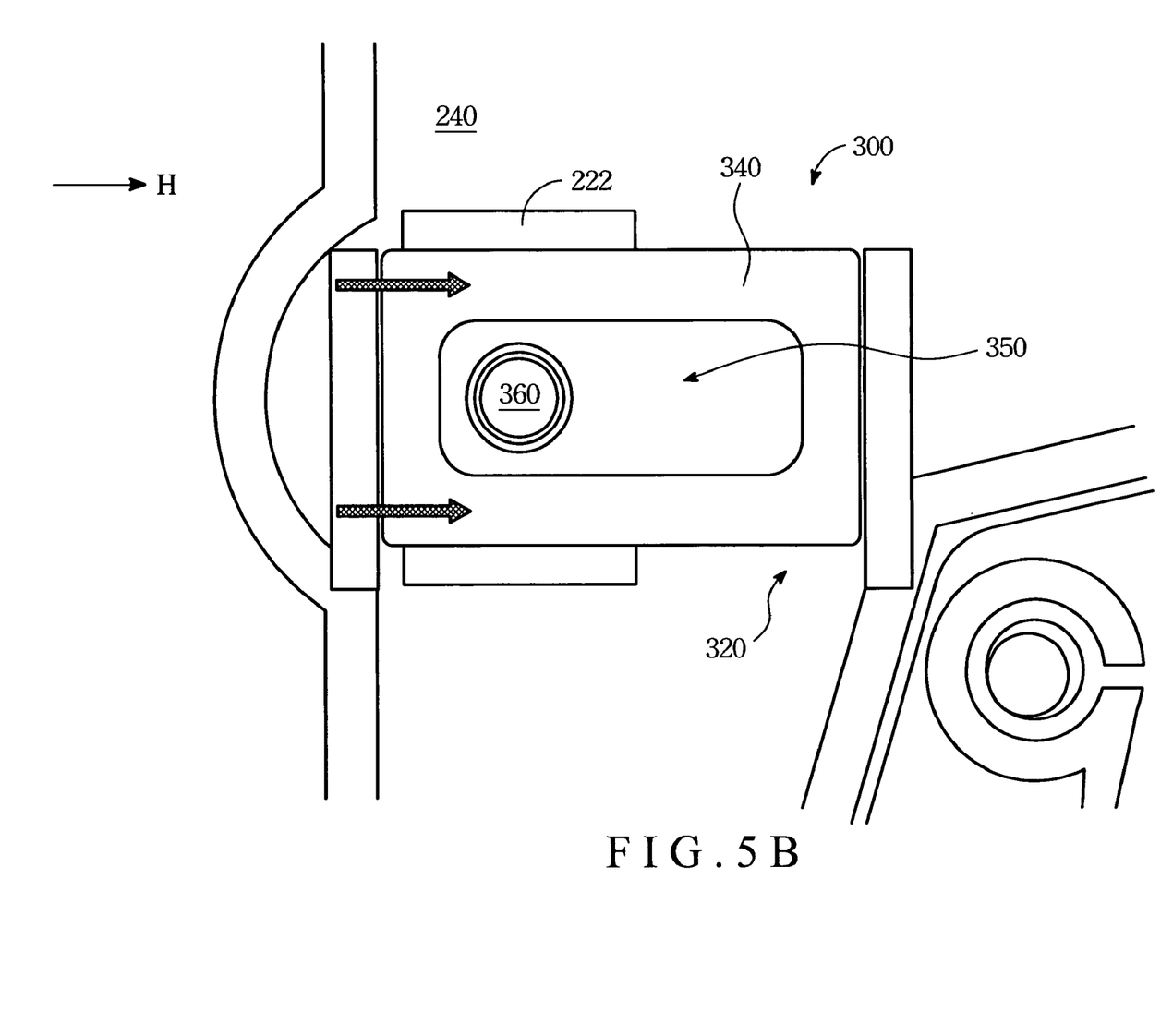

FIG. 5A is a schematic view of the lens adjusting device 200 in FIG. 3 adjusting the position of the lens 280 along the vertical direction V and FIG. 5B is a schematic view of the lens adjusting device 200 in FIG. 3 adjusting the position of the lens 280 along the horizontal direction H. As shown in FIG. 5A, when adjusting the lens 280 in the vertical direction V, the slider 340 is steady with respect to the base 220 with only relative movement being formed between the frame 240 and the slider 340. As shown in FIG. 5B, when adjusting the lens 280 in the horizontal direction H, both the slider 340 and the frame 240 move relative to the positioning unit 360 as well as the base 220.

Figure 5C:
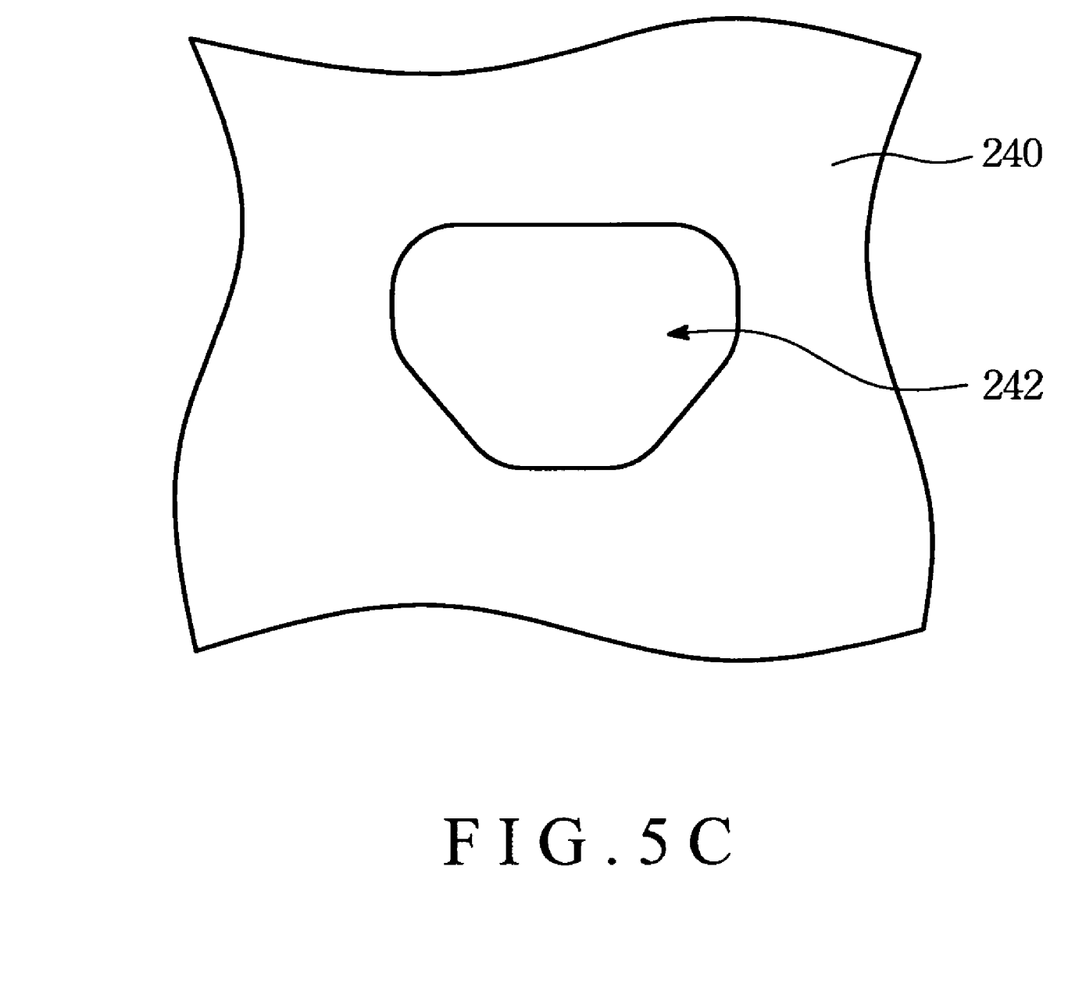
FIG. 5C is a schematic view of an embodiment of the through hole in the frame in FIG. 3.

In addition, as shown in FIG. 5C, to ensure a suitable movable range of the lens 280, for an embodiment, the through hole 242 of the frame 240 has a trapezoid shape. The width of the through hole 242 in the horizontal direction H defines the movable range of the frame 240 along the horizontal direction H, and the length of the through hole 242 in the vertical direction V defines the movable range of the frame 240 along the vertical direction V.

As shown in FIG. 3, the lens adjusting device 200 in the present embodiment has a horizontal adjusting gear set 230 and a vertical adjusting gear set 250. The horizontal adjusting gear set 230 is disposed on the base 220, and capable of transferring the rotation of the motor (not shown) into the linear movement of the frame 240 to adjust the position of the frame 240 relative to the base 220 in the horizontal direction H. The vertical adjusting gear set 250 is also disposed on the base 220, and capable of transferring the rotation of the motor into the linear movement of the frame 240 to adjust the position of the frame 240 relative to the base 220 in the vertical direction V. However, the invention is not limited to scope of using the motor to move the frame 240. The users may manually adjust the position of the frame 240.

Referring to FIG. 2, the lens adjusting device 100 needs two separate frames 140, 160 and several guiding bars 130, 150 to adjust the position of the lens 180. In contrast, as shown in FIG. 3, the lens adjusting device 200 in the embodiment of the invention saves a frame. Moreover, the lens adjusting device 200 in the embodiment of the invention replaces the guiding bars 130,150 with smaller and simpler positioning structures 300. Thus, the lens adjusting device 200 in the embodiment of the invention not only cuts down the cost, but also fulfills the demand of slim projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens adjusting device, comprising:
   a base;
   a frame;
   a lens, fixed on the frame; and
   at least one positioning structure, utilized for movably setting the frame on the base, the positioning structure having:
      a groove, disposed on the frame;
      a slider, disposed in the groove and having a guiding hole defined therein, and the guiding hole having an extending direction substantially perpendicular to an extending direction of the groove; and
      a positioning unit, slidably disposed in the guiding hole and penetrating the guiding hole to set the frame and the slider on the base,
   wherein the frame has at least one through hole corresponding to the positioning unit, and the size of the through hole is larger than the cross-section size of the positioning unit penetrating the through hole.

2. The lens adjusting device of claim 1 further comprising a first adjusting gear set, capable of adjusting a position of the frame relative to the positioning unit along a first direction.

3. The lens adjusting device of claim 2 further comprising a second adjusting gear set, capable of adjusting the position of the frame relative to the positioning unit along a second direction, wherein the second direction is substantially perpendicular to the first direction.

4. The lens adjusting device of claim 1, wherein the number of the at least one positioning structure is four, and the positioning structures are distributed around the lens symmetrically.

5. The lens adjusting device of claim 1, wherein the through hole has a trapezoid shape.

6. The lens adjusting device of claim 1 further comprising a washer disposed on the frame and covering the through hole, wherein the washer has an opening, the size of the opening is smaller than the size of the through hole, and the positioning unit penetrates the opening to set the frame and the slider on the base through the washer.

7. The lens adjusting device of claim 1 further comprising a spacer disposed between the base and the slider.

8. The lens adjusting device of claim 1, wherein the positioning unit is a screw.

9. The lens adjusting device of claim 8 further comprising an elastic unit disposed on the frame, wherein the screw presses the frame on the base through the elastic unit.

10. The lens adjusting device of claim 1, wherein the groove is disposed on a surface of the frame facing the base.

11. The lens adjusting device of claim 1, wherein the positioning unit penetrates the slider through the guiding hole.

\* \* \* \* \*